United States Patent [19]
Sim et al.

[11] Patent Number: 5,194,942
[45] Date of Patent: Mar. 16, 1993

[54] VARIABLE BANDWIDTH CONTROL APPARATUS FOR SEPARATING LUMINANCE AND CHROMINANCE SIGNALS AND THE METHOD THEREOF

[75] Inventors: Dae-yun Sim, Seoul; Jun-mo Jeong, Kyunggi, both of Rep. of Korea

[73] Assignee: Samsung Electronics Co., Ltd., Suwon, Rep. of Korea

[21] Appl. No.: 704,377

[22] Filed: May 22, 1991

[30] Foreign Application Priority Data

Jun. 30, 1990 [KR] Rep. of Korea .................. 90-9874

[51] Int. Cl.$^5$ ............................................... H04N 9/78
[52] U.S. Cl. ...................................................... 358/31
[58] Field of Search ................................. 358/31, 36

[56] References Cited

U.S. PATENT DOCUMENTS

| | | | |
|---|---|---|---|
| 4,389,665 | 6/1983 | Nagao et al. | 358/31 |
| 4,626,894 | 12/1986 | Harwood et al. | 358/31 |
| 4,916,526 | 4/1990 | Faroudja et al. | 358/31 |
| 5,097,321 | 3/1992 | Stern et al. | 358/31 |

FOREIGN PATENT DOCUMENTS

0125792 6/1987 Japan .

Primary Examiner—Victor R. Kostak
Assistant Examiner—Jeffrey S. Murrell
Attorney, Agent, or Firm—Robert E. Bushnell

[57] ABSTRACT

An apparatus for separating a composite video signal into luminance and chrominance signals and the method thereof which comprises: a narrow band pass filter and a wide band pass filter for receiving a primarily comb-filtered composite video signals, respectively; two level detectors for detecting a degree of color change which is a difference between chrominance signals outputted from the band pass filters, respectively, and an amplitude of the chrominance signal outputted from the wide band pass filter, respectively; two coefficient generators for generating respective coefficients corresponding to the values detected from the level detectors; and two multipliers and an adder, for processing respective predetermined interval delayed signals, i.e., the delayed transition chrominance signal and a delayed output signal of the narrow band pass filter, and the coefficients outputted from the coefficient generators. Accordingly, the comb-filtered composite video signal is filtered by changing the bandwidth according to an amplitude of chrominance signal and a degree of color change, thereby minimizing the obstacle factors causing deterioration of the picture quality so as to provide an improved picture.

22 Claims, 5 Drawing Sheets

VARIABLE BANDWIDTH CONTROL APPARATUS FOR SEPARATING LUMINANCE AND CHROMINANCE SIGNALS AND THE METHOD THEREOF

BACKGROUND OF THE INVENTION

The present invention relates to an apparatus and the method for separating a composite video signal into luminance and chrominance signals in a video signal processing apparatus, and particularly to an apparatus for separating luminance and chrominance signals and the method thereof in which a band pass filter is used to separate a chrominance signal from a composite video signal by varying its bandwith according to the amplitude of a chrominance signal and a degree of color change, thereby reducing deterioration of the picture quality.

Generally, in a composite video signal used in a television, etc., the frequencies of luminance and chrominance signals are multiplexed, so that all information have been transferred while minimizing the bandwidth. Recently, according to the consumer's desire for a high quality picture and a large wide screen display, the existing problem of picture quality deterioration that was not noticeable on a small wide screen display or from a distance becomes severe. That is, in the conventional method such as a one dimensional separation of luminance and chrominance signals, the luminance and chrominance signals are not completely separated from and mixed with each other even after passing through a band pass filter, thereby causing crosstalk. Thus, deterioration of the picture quality caused by crosstalk is noticeable. Such a problem is also generated in other frequency multiplex television systems (for instance, NTSC, PAL, and so on), but, for convenience, hereinafter the present invention is described by limiting a composite video signal in an NTSC system.

A spectrum diagram of a general composite video signal is shown in FIG. 1, and a block diagram of a conventional apparatus for separating luminance and chrominance signals is shown in FIG. 2.

A composite video signal V consists of a luminance signal Y and a chrominance signal C, and if we show an R−Y signal component of the composite video signal as "Er−y", and a B−Y signal component as "Eb−y", the composite video signal V and the chrominance signal C is represented as follows:

$$V(t) = Y(t) + C(t)$$

$$C(t) = Er - y \cdot \cos(2\pi fsc \cdot t) + Eb - y \cdot \sin(2\pi fsc \cdot t)$$

where, fsc is a carrier frequency of the chrominance signal C, and is about 3.58 MHz. The bandwidth of the luminance signal Y of the composite video signal is about 0 to 4.2 MHz, and the signals Er−y and Eb−y are modulated into signals I and Q, and transmitted with bandwidths of 1.5 MHz and 0.5 MHz, respectively. Detailed information in this respect is omitted, because it is referred to in references for the NTSC standard.

The luminance and chrominance signals that appear to be overlap according to the spectrum of FIG. 1 are interleaved in such a manner that a chrominance signal is inserted between luminance signals by this frequency interleaving. To separate luminance and chrominance signals from such a composite video signal V, a comb-filter 40 and a band pass filter 50 are conventionally used, and the common characteristic of such an apparatus for separating luminance and chrominance signals is in comprising the following luminance/chrominance signal separating process.

First, a composite video signal passes through a comb-filter and a band pass filter having a frequency band of 3.58±0.5 MHz, thereby obtaining a separated chrominance signal.

Second, a separated luminance signal is obtained by removing the separated chrominance signal from the composite video signal.

However, in such a luminance/chrominance signal separating process, the following problem causing deterioration of the picture quality is generated.

If the transmitted composite video signal is monochrome, the chrominance signal components are concentrated at about 3.58 MHz in the spectrum, and a band pass filter having a frequency band of 3.58±0.5 MHz is used to extract the chrominance signal component. However, as the actual composite video signal is not monochrome, but separated into various colors according to the contents of the picture, the chrominance signal is spread into the region of 3.58±1.5 MHz in the spectrum. To separate such a chrominance signal, if a frequency bandwidth of the band pass filter is set to 3.58±1.5 MHz, the frequency bandwidth of the luminance signal decreases to about 0 to 2 MHz and results in some loss of the high frequency component of the luminance signal, thereby deteriorating the resolution of the picture. Also, a cross-color phenomenon is generated by the high frequency component of the luminance signal being mixed in with the separated chrominance signal, thereby causing deterioration of the picture. In contrast, when the bandwidth of the band pass filter is fixed at 3.58±0.5 MHz, the non-filtered chrominance signal component is included in the luminance signal, generating a dot crawl phenomenon, thereby causing deterioration of the picture.

As described above, in case of watching a small wide screen or watching from a distance, the cross color phenomenon or the dot crawl phenomenon that causes deterioration of the picture quality is not noticeable, but in the case of watching a large wide screen or watching at a near distance, the deterioration of he picture quality is noticeable. To reduce the deterioration of the picture quality by preventing these phenomena, it is an important factor how wide or narrow the frequency bandwidth of the band pass filter is, i.e. what is determined to be the value X in the case of the bandwidth of 3.58±X MHz.

SUMMARY OF THE INVENTION

Accordingly, it is an object of the present invention to provide an apparatus for separating luminance and chrominance signals and the method thereof by detecting an amplitude of a chrominance signal and a degree of a color change to separate luminance and chrominance signals from a composite video signal, from which the bandwidth of a band pass filter is varied, to separate effectively the chrominance signal.

To achieve the object, according to the present invention, an apparatus for separating luminance and chrominance signals having an analog/digital (A/D) converter for converting an analog composite video signal input into a digital signal output, a delaying unit for delaying the digital composite video signal for a predetermined interval, a comb-filter for comb-filtering the digital composite video signal, band pass filtering means for filtering a comb-filtered signal outputted from the comb-filter and outputting a desired chrominance signal, and means for subtracting the chrominance signal supplied from the band pass filter from the digital composite video signal supplied from the delaying unit, wherein the band pass filtering means comprises:

a narrow band pass filter and a wide band pass filter having frequency bandwidths of 3.58±0.5 MHz and 3.58±1.5 MHz, respectively, and for receiving a chrominance signal that is primarily filtered in the comb-filter;

a first level detecting unit for detecting the amplitude of a chrominance signal supplied from the wide band pass filter;

a second level detecting unit for detecting the amplitude of a transition chrominance signal which is a difference between chrominance signals outputted from the narrow band pass filter and the wide band pass filter, respectively;

a first coefficient generator for generating a coefficient corresponding to an amplitude of the chrominance signal outputted from the first level detecting unit;

a second coefficient generator for generating a coefficient corresponding to a degree of color change outputted from the second level detecting unit;

a first delaying unit for delaying the transition chrominance signal for a predetermined interval;

a second delaying unit for delaying a chrominance signal outputted from the narrow band pass filter for a predetermined interval;

means for multiplying a coefficient that is obtained by multiplying the coefficients outputted from the first and second coefficient generators respectively, by a delayed transition chrominance signal output from the first delaying unit, and adding the transition chrominance signal obtained from the multiplication product into a delayed chrominance signal outputted from the second delaying unit, thereby outputting a finally separated chrominance signal.

Also, there is provided a method for separating luminance and chrominance signals according to the present invention comprising the steps of:

converting an inputted analog composite video signal into a digital composite video signal;

delaying said digital composite video signal for a predetermined interval;

comb-filtering said digital composite video signal;

filtering the comb-filtered signal into a variable band by changing the frequency bandwidth according to an amplitude of a chrominance signal and a degree of color change included in said comb-filtered signal so as to output a desired chrominance signal; and extracting a desired luminance signal by subtracting the chrominance signal filtered into said variable band from said delayed composite video signal.

BRIEF DESCRIPTION OF THE DRAWINGS

The above object and other advantages of the present invention will become more apparent by describing the preferred embodiments of the present invention with reference to the attached drawings, in which.

DETAILED DESCRIPTION OF THE INVENTION

Figure 2:
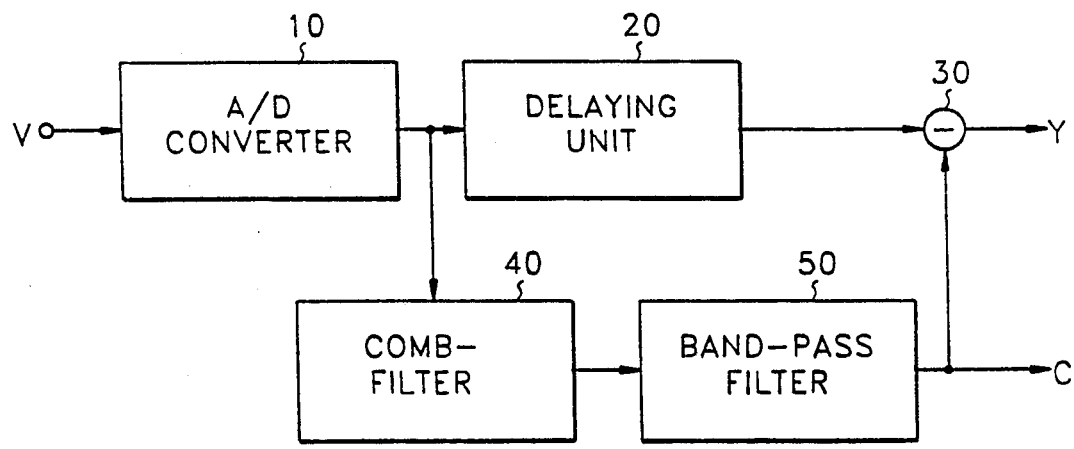
FIG. 2 is a block diagram of a conventional apparatus for separating luminance and chrominance signals.

First, an operation of a conventional apparatus for separating luminance and chrominance signals, shown in FIG. 2 is described.

As shown in FIG. 2, an A/D converter 10 converts an inputted analog composite video signal into a digital composite video signal and transmits the converted signal to a delaying unit 20 and a comb-filter 40, respectively. The comb-filter 40 filters the composite video signal using a line memory for delaying the inputted composite video signal for 1 H or 2 H in which a unit of "H" is a period of a horizontal sync frequency, that is, 1/15.75 KHz=63.5 μs, thereby outputting a primarily separated chrominance signal. The comb-filtered chrominance signal includes a luminance signal that is not completely separated during filtering, and to minimize such a luminance signal mixed in the comb-filtered chrominance signal, a band pass filter 50 is used for filtering the comb-filtered chrominance signal again, so a finally separated chrominance signal C is obtained. Also, the finally separated chrominance signal C is supplied to a subtracter 30. The subtracter 30 subtracts the finally separated chrominance signal C from the digital composite video signal supplied from the delaying unit 20, so a separated luminance signal Y is obtained.

Now, the delaying unit 20 delays the digital composite video signal for a predetermined time which corresponds to the time needed to output a desired chrominance signal C via the comb-filter 40 and the band pass filter 50, thereby matching the delayed composite video signal with the separated chrominance signal C in the subtracter 30.

In such a conventional apparatus for separating luminance and chrominance signals, the band pass filter 50 has a fixed frequency band. Thus, when the transition chrominance signal according to the color change deviates from the bandwidth, separation of the chrominance signal is not appropriately carried out, thereby causing deterioration of the picture quality.

Figure 3:
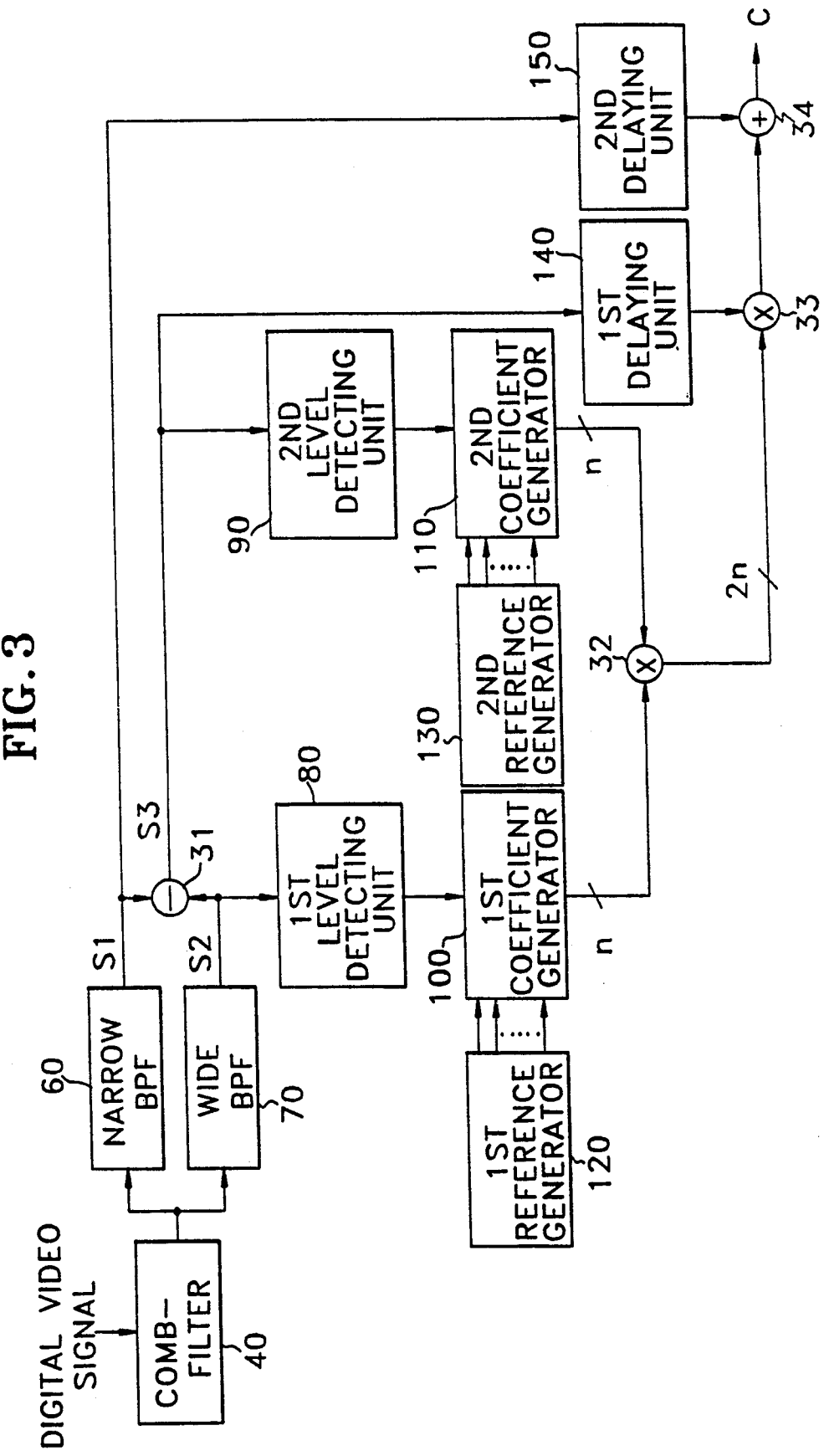
FIG. 3 is a block diagram showing an embodiment of an apparatus for separating luminance and chrominance signals, according to the present invention.

To solve such a conventional problem, the apparatus for separating luminance and chrominance signals according to the present invention uses a filtering means as shown in FIG. 3 in place of a conventional band pass filter 50. In detail, the filtering means comprises:

a narrow band pass filter 60 and a wide band pass filter 70 having frequency bandwidths of 3.58±0.5 MHz and 3.58±1.5 MHz, respectively;

first and second level detecting units 80 and 90 for detecting the amplitude of a chrominance signal and a degree of color change, respectively;

first and second coefficient generators 100 and 110 for generating respective coefficients corresponding to the amplitude of the chrominance signal and the degree of color change detected;

first and second reference generators 120 and 130 for supplying reference values, needed to generate coefficients, to the first and second coefficient generators 100 and 110, respectively;

first and second delaying units 140 and 150 for delaying the transition chrominance signal S3 and an output signal S1 of the narrow band pass filter 60 for respective predetermined intervals, thereby multiplying or adding signals outputted from the two coefficient generators 100 and 110 and the two delaying units 140 and 150 to obtain a finally separated chrominance signal C.

Figure 4:
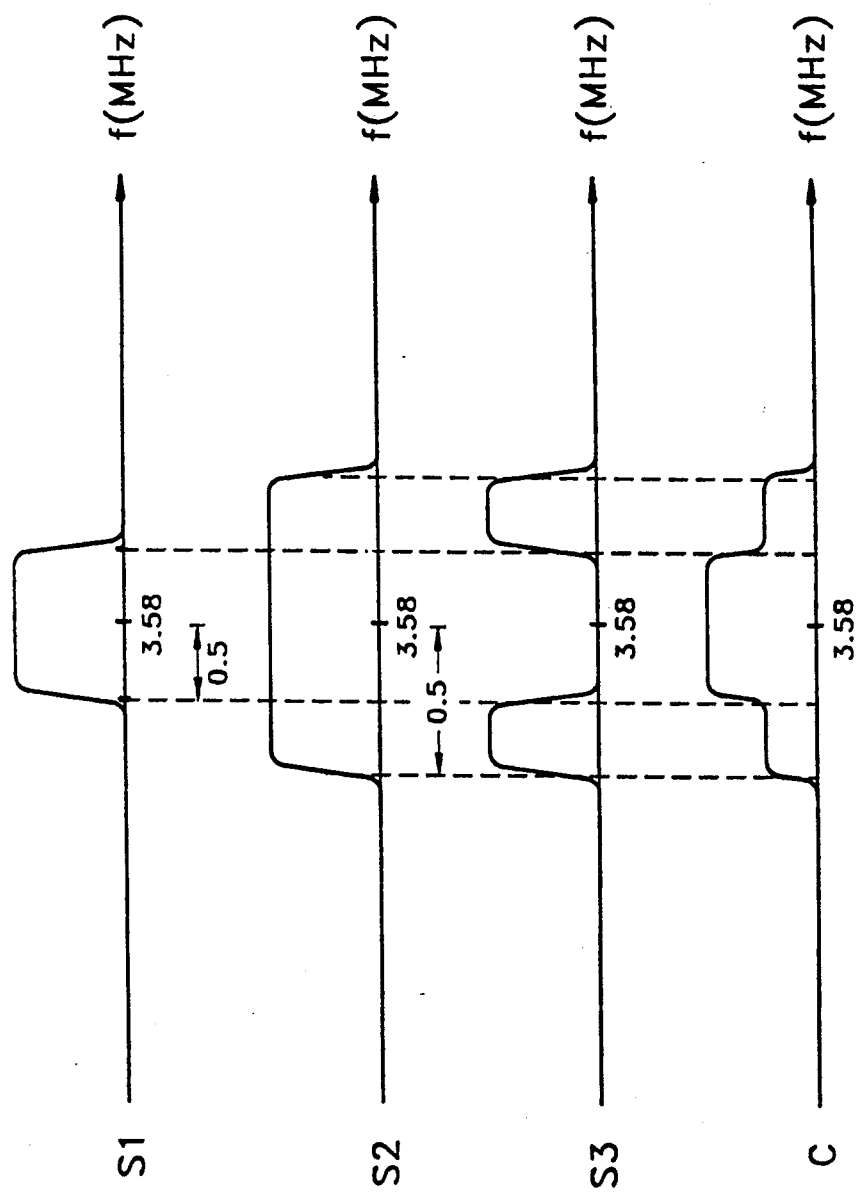
FIG. 4 is a waveform diagram showing output frequency characteristics of some essential parts shown in FIG. 3.

The frequency characteristics of respective output signals S1 and S2 of the narrow and wide band pass filters 60 and 70, a transition chrominance signal S3, and a finally separated chrominance signal C are shown in FIG. 4.

In this drawing, "S1" shows the frequency characteristic of a chrominance signal, which has passed through the narrow band pass filter 60, with a narrow frequency band of 3.58±0.5 MHz. And, "S2" shows the frequency characteristic of a chrominance signal, which has passed through the wide band pass filter 70, with a wide frequency band of 3.58±1.5 MHz. Also, "S3" shows the frequency characteristic of a transition chrominance signal which is a difference component between the signals S1 and S2 and shows the degree of color change. "C" shows the characteristic of a finally separated chrominance signal.

Figure 5:
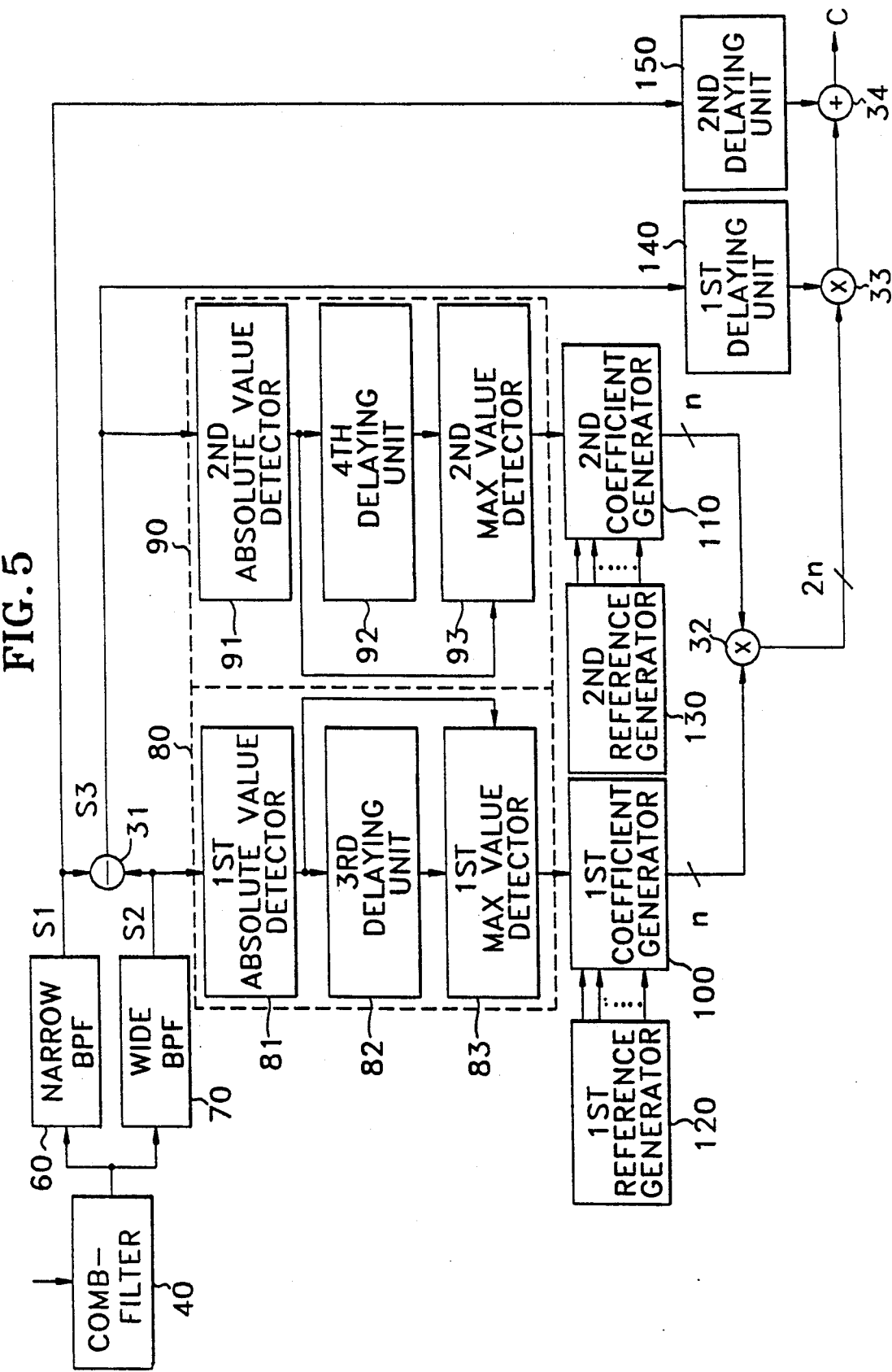
FIG. 5 is a block diagram detailedly showing some blocks shown in FIG. 3.

FIG. 5 is a block diagram detailedly showing the first and second level detecting units 80 and 90 in FIG. 3.

As shown in the drawing, each level detecting unit comprises an absolute value detector, a delaying unit, and a maximum value detector.

Figure 1:
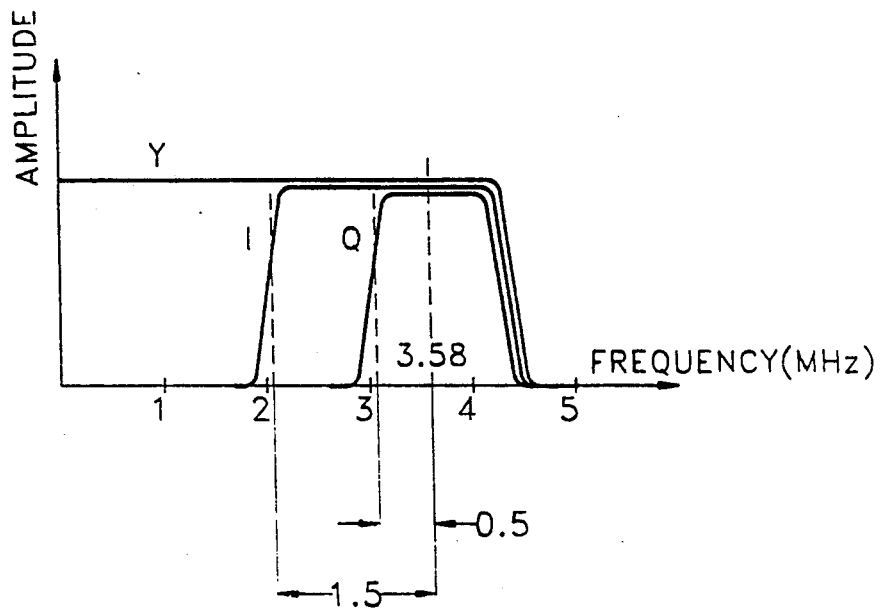
FIG. 1 is a spectrum diagram of a conventional composite video signal.

A chrominance signal primarily separated in the comb-filter 40 is input to the narrow band pass filter 60 and the wide band pass filter 70. Now, the comb-filtered chrominance signal is varied from a signal Q to a signal I according to the color change, as shown in FIG. 1, and also includes a luminance signal Y that is not completely separated during comb-filtering. The narrow band pass filter 60 and the wide band pass filter 70 which have frequency bands of 3.58±0.5 MHz and 3.58±1.5 MHz, respectively, output the signal S1 of a narrow frequency band and the signal S2 of a wide frequency band, respectively. And, the two signals S1 and S2 are supplied respectively to a first subtracter 31 to output a transition chrominance signal S3 which is a difference component between the two signals S1 and S2. The chrominance signal S2 outputted from the wide band pass filter 70 is input to a first absolute value detector 81, in which the chrominance signal S2 is converted to an absolute value. The chrominance signal output of an absolute value supplied from the first absolute value detector 81 is directly input to a first maximum value detector 83, and concurrently is delayed by 90 degrees via a third delaying unit 82 and is then supplied to the first maximum value detector 83. The first maximum value detector 83 detects the maximum value between the inputted two signals, thereby detecting an amplitude of a chrominance signal. The first coefficient generator 100 receives the maximum value corresponding to the detected amplitude of the chrominance signal, and compares it with the predetermined reference values generated from the first reference generator 120, thereby generating an n-bit coefficient.

Concurrently, the transition chrominance signal S3 passes through a second absolute value detector 91, a fourth delaying unit 92, and a second maximum value detector 93, like the chrominance signal S2, so a degree of color change is detected. The second coefficient generator 110 receives the maximum value of the detected degree of color change supplied from the second maximum value detector 93, and compares it with the predetermined reference values generated from the second reference generator 130, thereby generating an n-bit coefficient.

The n-bit coefficients respectively generated in the first and second coefficient generators 100 and 110 are multiplied in a first multiplier 32, so that a 2n-bit final coefficient is obtained.

Concurrently, the transition chrominance signal S3 is input to the first delaying unit 140 connected in parallel with the second level detecting unit 90. The first delaying unit 140 delays the inputted transition chrominance signal S3 for a predetermined time, and then supplies it to the second multiplier 33, thereby matching the final coefficient received at the other input terminal of the second multiplier 33 with the delayed transition chrominance signal in the second multiplier 33.

Accordingly, since the delayed transition chrominance signal is multiplied by the 2n-bit final coefficient in the second multiplier 33, a transition chrominance signal whose amplitude is determined according to the amplitude of the chrominance signal and a degree of color change is obtained.

Concurrently, the chrominance signal S1 output from the narrow band pass filter is input to the second delaying unit 150 connected in parallel with the first subtracter 31.

The second delaying unit 150 delays the inputted chrominance signal S1 for a predetermined interval and transmits the delayed chrominance signal to an adder 34, thereby matching the output signal of the second multiplier 33 received at the other input terminal of the adder 34 with the delayed chrominance signal in the adder 34.

Accordingly, since the delayed chrominance signal and the transition chrominance signal outputted from the second multiplier 33 are added in the adder 34, the chrominance signal having a frequency characteristic such as "C" of FIG. 4 is obtained (where, the frequency characteristic shown in this drawing shows when the final coefficient is about 0.5).

Figure 6:
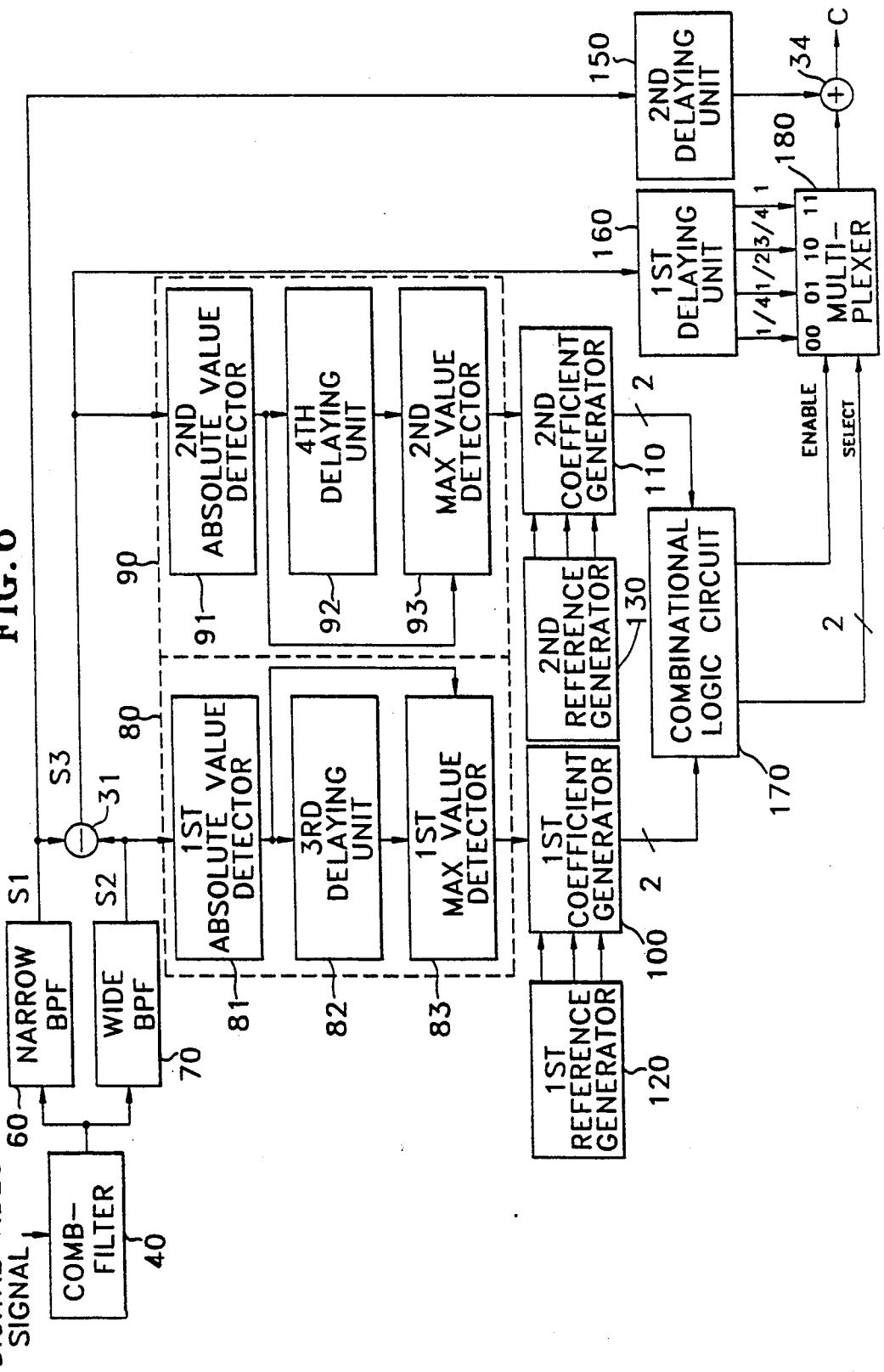
FIG. 6 is a block diagram showing another embodiment of an apparatus for separating luminance and chrominance signals, according to the present invention.

Another embodiment of such an apparatus for separating luminance and chrominance signals is shown in FIG. 6. As shown in this drawing, each of the coefficients generated from the first and second coefficient generators 100 and 110 is of 2 bits, and a combinational logic circuit 170 and a multiplexer 180 are provided in place of the first and second multipliers 32 and 33, simplifying control of the outputted transition chrominance signal.

In FIG. 6, a first coefficient generator 100 receives the maximum value corresponding to an amplitude of a chrominance signal outputted from the first level detecting unit 80, and compares the amplitude of the chrominance signal with three reference values generated in the first reference generator 120, thereby generating a 2-bit coefficient as the result.

Also, like in the first coefficient generator 100, the second coefficient generator 110 generates a coefficient corresponding to the degree of the color change, thereby generating a 2-bit coefficient.

The combinational logic circuit 170 receives the coefficients respectively generated in the first and second coefficient generators 100 and 110 and then supplies a 2-bit selection signal and an enable signal to the multiplexer 180.

Concurrently, the transition chrominance signal S3 output from the first subtracter 31 is input to the fifth delaying unit 160, where the amplitude of the signal S3 is modified into three-quarters, a half, a quarter times, respectively, which are output with the original signal through four output terminals of the fifth delaying unit 160, respectively.

The multiplexer 180 receives two control signals outputted from the combinational logic circuit 170 and four transition chrominance signals outputted from the fifth delaying unit 160, respectively, and selects one of the four transition chrominance signals having different amplitudes by the two control signals.

That is, when the enable signal is received at the enable terminal of the multiplexer 180 from the combinational logic circuit 170 and the 2-bit selection signal outputted from the combinational logic circuit 170 is input to the selection terminal of the multiplexer 180, one of the inputted transition chrominance signals whose amplitudes have been converted into a quarter, a half, three quarters, and one times is selected, according to the data value of the selection signals having one of the following binary values 00, 01, 10 and 11.

The following table 1 shows the results when one of the four color transition signals is selected according to the two control signal generated by the first and second coefficients.

TABLE 1

| first coefficient | second coefficient | | | |
|---|---|---|---|---|
| | 00 | 01 | 10 | 11 |
| 00 | 0 | 0 | 0 | 0 |
| 01 | 0 | $\frac{1}{4}$ | $\frac{1}{4}$ | $\frac{1}{4}$ |
| 10 | 0 | $\frac{1}{2}$ | $\frac{1}{2}$ | $\frac{3}{4}$ |
| 11 | 0 | $\frac{1}{2}$ | $\frac{3}{4}$ | 1 |

Karnaugh maps are made with respect to the first and second 2-bit coefficients, which are input signals, and an enable signal and a 2-bit selection signal, which are output signals, so that the combinational logic circuit 170 is accomplished by a plurality of AND and OR gates. Since the transition chrominance signal selected in this manner and transmitted from the multiplexer 180 to the adder 34 is added to the output signal S1 of the narrow band pass filter 60 passed through the second delaying unit 150, in the adder 34, as referenced in FIG. 5, the finally separated chrominance signal C is obtained. Accordingly, the finally separated chrominance signal C is input to the subtracter 30 as described in FIG. 2 and then is subtracted from the composite video signal delayed for a predetermined interval, so that the separated luminance signal Y can be detected.

As described above, according to the present invention, an apparatus for separating luminance and chrominance signals and the method thereof is provided with a filtering means and the method thereof for separating a chrominance signal by changing the bandwidth according to an amplitude of a chrominance signal and a degree of color change, instead of a conventional band pass filter having a fixed frequency band, thereby preventing a cross color phenomenon and a dot crawl phenomenon so as to provide a further improved picture.

What is claimed is:

1. An apparatus for separating luminance and chrominance signals, comprising:
    first delay means coupled to receive digital video signals, for delaying said digital video signals for a first predetermined time period to provide delayed digital video signals;
    comb-filter means coupled to receive said digital video signals, for comb-filtering said digital video signals to provide comb-filtered signals;
    first band-pass filter means having a narrow frequency bandwidth, for filtering said comb-filtered signals to provide first filtered chrominance signals;
    second band-pass filter means having a wide frequency bandwidth, for filtering said comb-filtered signals to provide second filtered chrominance signals;
    first level detector means coupled to receive said second filtered chrominance signals, for detecting amplitude levels of said second filtered chrominance signals;
    first subtractor means for subtracting said first filtered chrominance signals from said second filtered chrominance signals to provide transition chrominance signals;
    second level detector means coupled to receive said transition chrominance signals, for detecting degrees of color change;
    first coefficient generator means for generating a first coefficient corresponding to the amplitude of said second filtered chrominance signals;
    second coefficient generator means for generating a second coefficient corresponding to the degrees of color change of said transition chrominance signals;
    second delay means coupled to receive said transition chrominance signals, for delaying said transition chrominance signals for a second predetermined time period to provide delayed transition chrominance signals;
    third delay means coupled to receive said first filtered chrominance signals, for delaying said first filtered chrominance signals for a third predetermined time period to provide delayed chrominance signals;
    means for multiplying said first and second coefficients with said delayed transition chrominance signals to provide multiplied chrominance signals, and adding said multiplied chrominance signals to said delayed chrominance signals to provide chrominance signals; and
    second subtractor means for subtracting said chrominance signals from the delayed digital video signals to provide luminance signals.

2. The apparatus for separating luminance and chrominance signals as claimed in claim 1 wherein said first level detector means comprises:
    absolute value detector means for converting said second filtered chrominance signals into absolute value signals;
    fourth delay means for delaying said absolute value signals for a fourth predetermined time period to provide delayed absolute value signals; and
    maximum value detector means coupled to receive said absolute value signals and said delayed absolute value signals, for detecting maximum values corresponding to the amplitude levels of said second filtered chrominance signals.

3. The apparatus for separating luminance and chrominance signals as claimed in claim 1 wherein said second level detector means comprises:
absolute value detector means for converting said transition chrominance signals into absolute value signals;
fourth delay means for delaying said absolute value signals, for a fourth predetermined time period to provide delayed absolute value signals; and
maximum value detector means coupled to receive said absolute value signals and said delayed absolute value signals, for detecting maximum values corresponding to the degrees of color change from said transition chrominance signals.

4. The apparatus for separating chrominance and luminance signals as claimed in claim 1 wherein said narrow frequency bandwidth is approximately about 3 MHz to 4.2 MHz, and said wide frequency bandwidth is approximately about 2 MHz to 5.2 MHz.

5. An apparatus for separating luminance and chrominance signals, comprising:
first delay means coupled to receive digital video signals, for providing delayed video signals by delaying said digital video signals for a first predetermined time period;
comb-filter means coupled to receive said digital video signals, for comb-filtering said digital video signals to provide comb-filtered signals;
first band-pass filter means having a narrow frequency bandwidth, for filtering said comb-filter signals to provide first filtered chrominance signals;
second band-pass filter means having a wide frequency bandwidth, for filtering said comb-filtered signals to provide second filtered chrominance signals;
first level detector means coupled to receive said second filtered chrominance signals, for detecting amplitude levels of said second filtered chrominance signals;
first subtractor means for subtracting said first filtered chrominance signals from said second chrominance signals to provide transition chrominance signals;
second level detector means coupled to receive said transition chrominance signals, for detecting degrees of color change of said transition chrominance detecting degrees of color change of said transition chrominance signals;
first coefficient generator means for generating a first coefficient corresponding to the amplitude levels of said second filtered chrominance signals;
second coefficient generator means for generating a second coefficient corresponding to the degrees of color change of said transition chrominance signals;
second delay means for delaying said first filtered chrominance signals for a second predetermined time period to provide delayed chrominance signals;
third delay means for delaying said transition chrominance signals and multiplying the amplitude of said transition chrominance signals by a plurality of multiplication factors to provide a plurality of delayed transition chrominance signals corresponding to said plurality of multiplication factors;
logic means coupled to receive said first and second coefficients, for generating control signals representative of one of a select signal and an enable signal;
multiplexer means for selecting one of said plurality of delayed transition chrominance signals in response to said control signals to provide selected chrominance signals;
adder means for adding said selected chrominance signals to said delayed chrominance signals to provide chrominance signals; and
second subtractor means for subtracting said chrominance signals from said delayed video signals to provide luminance signals.

6. The apparatus for separating luminance and chrominance signals as claimed in claim 5, wherein said first level detector means comprises:
absolute value detector means for converting said second filtered chrominance signals into absolute value signals;
fourth delay means for providing delayed value signals by delaying said absolute value signals for a fourth predetermined time period to provide delayed absolute value signals; and
maximum value detector means coupled to receive said absolute value signals and said delayed value signals, for detecting maximum values corresponding to the amplitude levels of said second filtered chrominance signals.

7. The apparatus for separating luminance and chrominance signals as claimed in claim 5, wherein said second level detector means comprises:
absolute value detector means for converting said transition chrominance signals into absolute value signals;
fourth delay means for providing delayed value signals by delaying said absolute value signals for a fourth predetermined time period to provide delayed absolute value signals; and
maximum value detector means coupled to receive said absolute value signals and said delayed value signals, for detecting maximum values corresponding to the degrees of color change of said transition chrominance signals.

8. The apparatus for separating chrominance and luminance signals as claimed in claim 5, wherein said narrow frequency bandwidth is approximately about 3 MHz to 4.2 MHz, and said wide frequency bandwidth is approximately about 2 MHz to 5.2 MHz.

9. An apparatus for separating luminance and chrominance signals having means for receiving composite digital video signals, a first delay for delaying the digital video signals for a first predetermined time period, a comb-filter for comb-filtering the digital video signals to provide comb-filtered signals, and band-pass filter means for filtering the comb-filtered signals to provide separated chrominance signals, and means for subtracting the separated chrominance signals from the delayed digital video signals to provide separated luminance signals, wherein said band-pass filter means comprises:
a narrow band pass filter and a wide band pass filter having frequency bandwidths of 3.58±0.5 MHz and 3.58±1.5 MHz, respectively, coupled to receive said comb-filtered signals, for filtering said comb-filtered signals to respectively provide first and second filtered chrominance signals;
a subtractor for subtracting said first and second filtered chrominance signals to provide transition chrominance signals;

a first level detector for detecting amplitude levels of said second filtered chrominance signals to provide first detected signals;

a second level detector for detecting degrees of color change of said transition chrominance signals to provide second detected signals;

a first coefficient generator for generating a first coefficient corresponding to the amplitude levels of said first detected signals;

a second coefficient generator for generating a second coefficient corresponding to the degrees of color change of said second detected signals;

a second delay for delaying said transition chrominance signals for a second predetermined time period to provide delayed transition chrominance signals;

a third delay for delaying said first filtered chrominance signals for a third predetermined time period to provide delayed chrominance signals;

means for multiplying said first and second coefficients with said delayed transition chrominance signals to provide multiplied signals, and adding said multiplied signals to said delayed chrominance signals to provide separated chrominance signals.

10. The apparatus for separating luminance and chrominance signals as claimed in claim 9 wherein said first level detector comprises:

a converter for converting said second filtered chrominance signals into an absolute value;

a fourth delay for delaying said absolute value for a fourth predetermined time period to provide a delayed value; and a maximum value detector for detecting a maximum value between said absolute value and said delayed value to provide said first detected signals.

11. The apparatus for separating luminance and chrominance signals as claimed in claim 9 wherein said second level detector comprises:

a converter for converting said transition chrominance signals into an absolute value;

a fourth delay for delaying said absolute value for a fourth predetermined time period to provide a delayed value; and a maximum value detector for detecting a maximum value between said absolute value and said delayed value to provide said second detected signals.

12. A method for separating luminance and chrominance signals, comprising the steps of:

receiving digital video signals;

delaying said digital video signals for a first predetermined time period to provide delayed digital video signals;

comb-filtering said digital video signals to provide comb-filtered signals;

filtering said comb-filtered signal by a narrow bandwidth to provide first filtered chrominance signals and by a wide bandwidth to provide second filtered chrominance signals;

detecting amplitude levels of said second filtered chrominance signals to provide first detected chrominance signals representative of the detected amplitude levels;

substracting said first filtered chrominance signals from said second filtered chrominance signal to obtain transition chrominance signals;

detecting degrees of color change of said transition chrominance signals to provide second detected chrominance signals representative of the detected degrees of color change;

generating a first coefficient corresponding to said first detected chrominance signals;

generating a second coefficient corresponding to said second detected chrominance signals;

delaying said first filtered chrominance signals for a second predetermined time period to provide delayed chrominance signals;

delaying said transition chrominance signals for a third predetermined time period to provide delayed transition chrominance signals;

multiplying said first and second detected chrominance signals with said delayed transition chrominance signals to provide multiplied chrominance signals;

adding said multiplied chrominance signals to said delayed chrominance signals to provide chrominance signals; and subtracting said chrominance signals from said delayed digital video signals to provide luminance signals.

13. The method for separating luminance and chrominance signals as claimed in claim 12 wherein said step for detecting amplitude levels of said second filtered chrominance signals further comprises the steps of:

converting said second filtered chrominance signals into an absolute value;

delaying said absolute value for a fourth predetermined time period to provide a delayed value; and detecting a maximum value between said absolute value and said delayed value.

14. The method for separating luminance and chrominance signals as claimed in claim 12 wherein said step for detecting degrees of color change further comprises the steps of:

converting said transition chrominance signals into an absolute value;

delaying said absolute value for a fourth predetermined time period to provide a delayed value; and detecting a maximum value between said absolute value and said delayed value.

15. An apparatus for separating chrominance signals from composite video signals, comprising:

means for receiving composite video signals;

comb-filter means for comb-filtering said composite video signals to provide comb-filtered signals;

first filter means having a narrow frequency bandwidth, for filtering said comb-filtered signals to provide first filtered chrominance signals;

second filter means having a wide frequency bandwidth, for filtering said comb-filtered signals to provide second filtered chrominance signals;

subtractor means for subtracting said first filtered chrominance signals from said second filtered chrominance signals to provide transition chrominance signals;

first detector means for detecting amplitude levels of said second filtered chrominance signals to provide a first detected maximum value corresponding to the detected amplitude levels of said second filtered chrominance signals;

second detector means for detecting degrees of color change of said transition chrominance signals to provide a second detected maximum value corresponding to the detected degrees of color change of said transition chrominance signals;

first generator means coupled to receive said first maximum value corresponding to the detected amplitude levels of said second filtered chrominance signals, for comparing said first maximum value with first reference values to provide a first coefficient;

second generator means coupled to receive said second maximum value corresponding to the detected degrees of color change of said transition chrominance signals, for comparing said second maximum value with second reference values to provide a second coefficient;

first delay means for delaying said transition chrominance signals for a first predetermined time period to provide delayed transition chrominance signals;

second delay means for delaying said first filtered chrominance signals for a second predetermined time period to provide delayed filtered chrominance signals;

multiplier means for multiplying said first and second coefficients with said delayed transition chrominance signals to provide multiplied chrominance signals; and adder means for adding said multiplied chrominance signals to said delayed filtered chrominance signals to provide chrominance signals.

16. The apparatus for separating chrominance signals from composite video signals as claimed in claim 15 wherein said narrow frequency bandwidth is approximately about 3 MHz to 4.2 MHz, and said wide frequency bandwidth is approximately about 2 MHz to 5.2 MHz.

17. The apparatus for separating chrominance signals from composite video signals as claimed in claim 15 wherein said first detector means comprises:
absolute value detector means for detecting absolute values of said second filtered chrominance signals to provide an absolute value;
fourth delay means for delaying said absolute value for a fourth predetermined time period to provide a delayed value; and
maximum value detector means for selecting one of said absolute value and said delayed value to provide said first detected maximum value corresponding to the detected amplitude levels of said second filtered chrominance signals.

18. The apparatus for separating luminance and chrominance signals as claimed in claim 15 wherein said second detector comprises:
absolute value detector for detecting absolute values of said transition chrominance signals to provide an absolute value;
fourth delay means for delaying said absolute value for a fourth predetermined time period to provide a delayed value; and
maximum value detector means for selecting one of said absolute value and said delayed value to provide said second detected maximum value corresponding to the detected degrees of color change of said transition chrominance signals.

19. The apparatus for separating chrominance signals from composite video signals as claimed in claim 15 wherein said narrow frequency bandwidth is approximately about 3 MHz to 4.2 MHz, and said wide frequency bandwidth is approximately about 2 MHz to 5.2 MHz.

20. The apparatus for separating chrominance signals from composite video signals as claimed in claim 15 wherein said first detector means comprises:
absolute value detector means for detecting absolute values of said second filtered chrominance signals to provide an absolute value;
fourth delay means for delaying said absolute value for a fourth predetermined time period to provide a delayed value; and
maximum value detector means for selecting one of said absolute value and said delayed value to provide said first detected maximum value corresponding to the detected amplitude levels of said second filtered chrominance signals.

21. The apparatus for separating luminance and chrominance signals as claimed in claim 15 wherein said second detector comprises:
absolute value detector for detecting absolute values of said transition chrominance signals to provide an absolute value;
fourth delay means for delaying said absolute value for a fourth predetermined time period to provide a delayed value; and
maximum value detector means for selecting one of said absolute value and said delayed value to provide said second detected maximum value corresponding to the detected degrees of color change of said transition chrominance signals.

22. An apparatus for separating chrominance signals from composite video signals, comprising:
means for receiving composite video signals;
comb-filter means for comb-filtering said composite video signals to provide comb-filtered signals;
first filter means having a narrow frequency bandwidth, for filtering said comb-filtered signals to provide first filtered chrominance signals;
second filter means having a wide frequency bandwidth, for filtering said comb-filtered signals to provide second filtered chrominance signals;
subtractor means for subtracting said first filtered chrominance signals from said second filtered chrominance signals to provide transition chrominance signals;
first detector means for detecting amplitude levels of said second filtered chrominance signals to provide a first detected maximum value corresponding to the detected amplitude levels of said second filtered chrominance signals;
second detector means for detecting degrees of color change of said transition chrominance signals to provide a second detected maximum value corresponding to the detected degrees of color change of said transition chrominance signals;
first generator means coupled to receive said first maximum value corresponding to the detected amplitude levels of said second filtered chrominance signals, for comparing said first maximum value with first reference values to provide a first coefficient;
second generator means coupled to receive said second maximum value corresponding to the detected degrees of color change of said transition chrominance signals, for comparing said second maximum value with second reference values to provide a second coefficient;
delay means for delaying said first filtered chrominance signals for a predetermine time period to provide delayed filtered chrominance signals;

means for multiplying said transition chrominance signals by a plurality of multiplication factors representative by 1, $\frac{1}{2}$, $\frac{1}{4}$ and $\frac{3}{4}$ to provide a plurality of multiplied chrominance signals;

logic means coupled to receive said first and second coefficients, for logically enabling transmission of a selection signal and an enable signal;

multiplexer means for enabling a selection of one of said plurality of multiplied chrominance signals in response to said selection signal and said enable signal to provide selected multiplied chrominance signals; and adder means for adding said selected multiplied chrominance signals to said delayed filtered chrominance signals to provide chrominance signals.

* * * * *

UNITED STATES PATENT AND TRADEMARK OFFICE
CERTIFICATE OF CORRECTION

PATENT NO. : 5,194,942
DATED : 16 March 1993
INVENTOR(S) : Dae-Yun SIM and Jun-Mo JEONG It is certified that error appears in the above-indentified patent and that said Letters Patent is hereby corrected as shown below:

Claim 17, Column 13, line 35, insert --,-- after "15".

Signed and Sealed this

Nineteenth Day of April, 1994

Attest:

BRUCE LEHMAN

Attesting Officer

Commissioner of Patents and Trademarks